United States Patent
Romriell et al.

(10) Patent No.: US 8,379,801 B2
(45) Date of Patent: Feb. 19, 2013

(54) METHODS AND SYSTEMS RELATED TO TEXT CAPTION ERROR CORRECTION

(75) Inventors: Joseph N. Romriell, Draper, UT (US); Scot Lorin Brooksby, Highland, UT (US); Shane Arthur Roylance, Farmington, UT (US); Brian Chevrier, Highland, UT (US); Robert Cochran Puzey, North Ogden, UT (US)

(73) Assignee: Sorenson Communications, Inc., Salt Lake City, UT (US)

( * ) Notice: Subject to any disclaimer, the term of this patent is extended or adjusted under 35 U.S.C. 154(b) by 696 days.

(21) Appl. No.: 12/624,973

(22) Filed: Nov. 24, 2009

(65) Prior Publication Data

US 2011/0123003 A1    May 26, 2011

(51) Int. Cl.
*H04M 11/00* (2006.01)
*H04N 5/76* (2006.01)
*G06F 17/27* (2006.01)
*G10L 15/18* (2006.01)

(52) U.S. Cl. ...... 379/52; 345/173; 348/231.99; 358/1.15; 380/46; 382/180; 386/278; 704/2; 704/9; 704/235; 704/257; 705/401; 706/11; 709/223; 715/201; 715/234; 715/255; 715/710; 715/769; 725/93

(58) Field of Classification Search .......... 345/173; 358/1.15; 379/52; 380/46; 382/180; 704/9, 704/235, 257, 2; 705/401; 706/11; 709/223; 715/201, 217, 234, 255, 257, 769, 710; 348/231.99; 386/278; 725/93
See application file for complete search history.

(56) References Cited

U.S. PATENT DOCUMENTS

| | | | | |
|---|---|---|---|---|
| 5,572,423 A | * | 11/1996 | Church | 715/257 |
| 5,576,955 A | * | 11/1996 | Newbold et al. | 715/217 |
| 5,636,340 A | * | 6/1997 | Bonneau et al. | 715/201 |
| 5,754,737 A | * | 5/1998 | Gipson | 706/11 |
| 6,075,842 A | | 6/2000 | Engelke et al. | |
| 6,101,467 A | * | 8/2000 | Bartosik | 704/235 |
| 6,174,170 B1 | * | 1/2001 | Olmedo | 434/307 A |
| 6,307,921 B1 | | 10/2001 | Engelke et al. | |
| 6,314,397 B1 | * | 11/2001 | Lewis et al. | 704/235 |
| 6,360,010 B1 | * | 3/2002 | Hu et al. | 382/180 |
| 6,473,778 B1 | * | 10/2002 | Gibbon | 715/201 |
| 6,882,707 B2 | | 4/2005 | Engelke et al. | |
| 6,885,731 B2 | | 4/2005 | Engelke et al. | |
| 6,940,617 B2 | * | 9/2005 | Ma et al. | 358/1.15 |
| 7,130,790 B1 | * | 10/2006 | Flanagan et al. | 704/2 |
| 7,164,753 B2 | | 1/2007 | Engelke et al. | |
| 7,516,404 B1 | * | 4/2009 | Colby | 715/257 |
| 8,140,337 B2 | * | 3/2012 | Nakazawa et al. | 704/257 |

(Continued)

OTHER PUBLICATIONS

CapTel® News, News & Helpful Tips for People Who Use CapTel, Summer 2007, newsletter.

(Continued)

*Primary Examiner* — Gerald Gauthier
(74) *Attorney, Agent, or Firm* — TraskBritt

(57) ABSTRACT

Systems and methods related to providing error correction in a text caption are disclosed. A method may comprise displaying a text caption including one or more blocks of text on each of a first device and a second device remote from the first device. The method may also include generating another block of text and replacing a block of text of the text caption with the another block of text. Furthermore, the method may include displaying the text caption on the second device having the block of text of the first text caption replaced by the another block of text.

29 Claims, 4 Drawing Sheets

U.S. PATENT DOCUMENTS

| | | | |
|---|---|---|---|
| 8,296,811 B1* | 10/2012 | Begeja et al. | 725/93 |
| 2002/0120647 A1* | 8/2002 | Amano | 707/501.1 |
| 2005/0069107 A1 | 3/2005 | Tanaka et al. | |
| 2005/0131840 A1* | 6/2005 | Pintsov et al. | 705/401 |
| 2005/0226394 A1 | 10/2005 | Engelke et al. | |
| 2005/0283726 A1* | 12/2005 | Lunati | 715/533 |
| 2006/0064631 A1* | 3/2006 | Parker | 715/500 |
| 2006/0092291 A1* | 5/2006 | Bodie | 348/231.99 |
| 2006/0095550 A1* | 5/2006 | Nemmaier et al. | 709/223 |
| 2007/0118373 A1* | 5/2007 | Wise et al. | 704/235 |
| 2007/0118374 A1* | 5/2007 | Wise et al. | 704/235 |
| 2007/0271510 A1* | 11/2007 | Grigoriu et al. | 715/533 |
| 2008/0155411 A1* | 6/2008 | Christensen | 715/710 |
| 2008/0187108 A1 | 8/2008 | Engelke et al. | |
| 2009/0263098 A1* | 10/2009 | Hyun et al. | 386/52 |
| 2010/0135486 A1* | 6/2010 | Schneider | 380/46 |
| 2010/0287486 A1* | 11/2010 | Coddington | 715/769 |
| 2010/0332217 A1* | 12/2010 | Wintner et al. | 704/9 |
| 2011/0018812 A1* | 1/2011 | Baird | 345/173 |
| 2011/0123003 A1* | 5/2011 | Romriell et al. | 379/52 |
| 2012/0130706 A1* | 5/2012 | Qiu et al. | 704/9 |

OTHER PUBLICATIONS

User Guide to Sprint CapTel Services, as early as Mar. 2009.
All CapTel 800 phones are being updated, Press Release, <http://www.kcdhh.org/bulletin/CapTel800Update.pdf>, as early as Oct. 2011.
CapTel News from Ultratec—Jul. 2005.

* cited by examiner

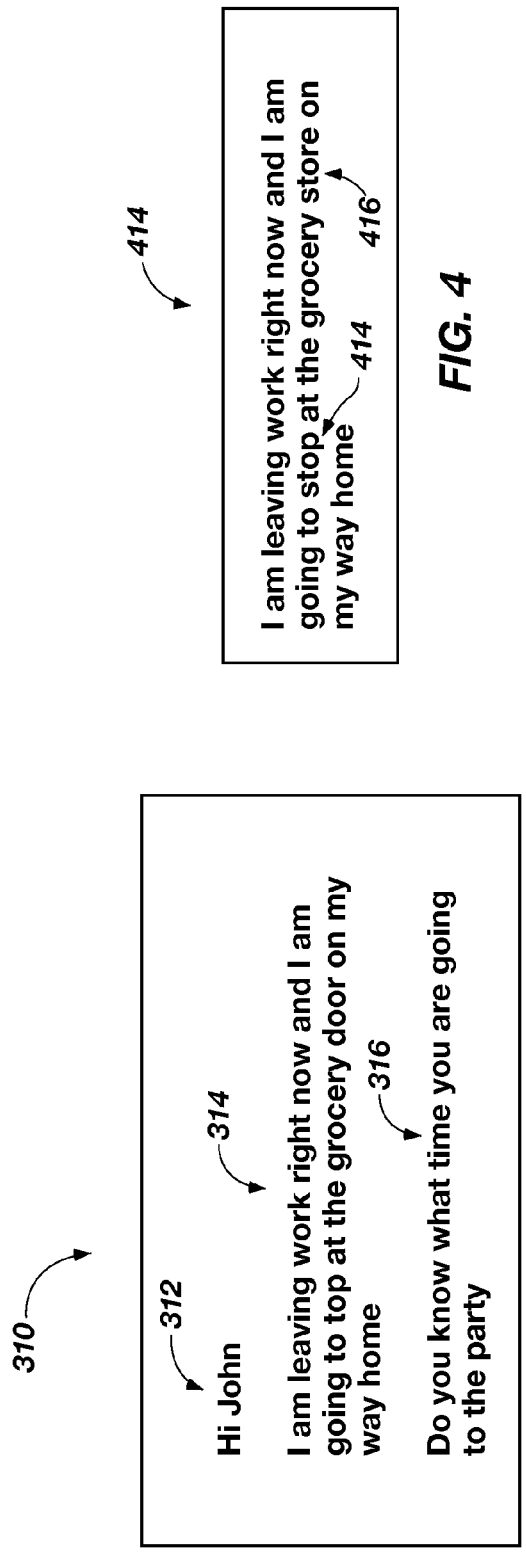

METHODS AND SYSTEMS RELATED TO TEXT CAPTION ERROR CORRECTION

TECHNICAL FIELD

Embodiments of the present invention relate generally to text captioning and more specifically to correction of errors within a text caption.

BACKGROUND

Modern telecommunication services provide features to assist those who are deaf or hearing-impaired. One such feature is a telecommunication device for the deaf (TDD). Hearing-capable users communicate with hearing-impaired users who are users of TDD devices through so-called "relays." A relay is a telecommunication intermediary service, which is intended to permit a deaf or a hearing-impaired person to utilize a normal telephone network. A relay service may include an operator, referred to as a "call assistant," who serves as a human intermediary between a hearing user and a hearing-impaired user. The call assistant communicates with the hearing-impaired user using a TDD and communicates with the hearing user by voice over a standard telephone line.

A text captioned telephone system employs a relay service in a mode where the relay transmits both the voice of the hearing user and a text stream of the words spoken by the hearing user. A hearing-impaired user using a text captioned telephone, or telephone enabled to do text enhanced telephony, may carry on a normal telephone conversation with a hearing user while a text transcription of the words spoken by the hearing user is displayed on the text captioned telephone. The text transcription may allow the hearing-impaired user to confirm his or her understanding of the words spoken by the hearing user.

More specifically, during a communication session, a call assistant may listen to the voice signal of a hearing user and "revoice" the words to a speech recognition computer program tuned to that call assistant's voice. A text transcription output from the speech recognition computer is then transmitted to the text captioned telephone being used by the hearing-impaired user. Even with revoicing provided by a trained call assistant, the text transcription received by the hearing-impaired user may include errors. Therefore, correction of the errors within the text transcription may be required.

According to various conventional methods, errors within a text caption are corrected by either backspacing an error in a text caption and displaying corrected text or providing a corrected portion (e.g., a word or a sentence) at the end of a previously provided text caption. Although, backspacing an error in a text caption and displaying corrected text may provide a hearing-impaired user with a context for the correction, this method is distracting to a hearing-impaired user and interrupts the continuity of a conversation between a hearing-impaired user and a hearing user. Further, providing a corrected portion at the end of a previously provided text caption not only interrupts the continuity of a conversation but also fails to provide context of the correction to the hearing-impaired user. Therefore, a hearing-impaired user must determine where the corrected text should be inserted into the previously provided text caption.

A need exists to improve text correction of a text captioning system. Specifically, there is a need for methods of providing text caption correction while providing a user with context of a correction and without distracting the user or interrupting the continuity of a conversation between a hearing-impaired user and a hearing user.

BRIEF SUMMARY OF THE INVENTION

In one embodiment of the present invention, a method of providing error correction in a text caption is disclosed. The method may comprise displaying a text caption including one or more blocks of text on each of a first device and a second device remote from the first device. The method may also include generating another block of text and replacing a block of text of the text caption with the another block of text. Furthermore, the method may include displaying the text caption on the second device having the block of text of the first text caption replaced by the another block of text.

In another embodiment of the present invention, a communication system is provided. The communication system may include a plurality of devices, wherein each device of the plurality includes a processor and a computer-readable medium coupled to the processor. The communication system may further include a plurality of application programs, wherein each application program is stored in an associated computer-readable medium. When executed by the processor, one or more application programs are configured to display a text caption including one or more blocks of text on a display device of each of a first device of the plurality of devices and a second device of the plurality of devices. One or more application programs may be configured to generate another block of text and replace one block of text of the text caption with the another block of text. Furthermore, one or more application programs may be configured to display the corrected text caption on the display device of the second device, wherein the at least one block of text of the text caption is replaced by the another block of text.

Another embodiment of the present invention may include a computer-readable media storage medium storing instructions that when executed by a processor cause the processor to perform instructions in accordance with one or more embodiments of the present invention.

BRIEF DESCRIPTION OF THE SEVERAL VIEWS OF THE DRAWINGS

FIG. 3 illustrates a text caption including errors;

FIG. 4 illustrates a corrected block of text;

FIG. 5 illustrates a corrected text caption including corrected text and further including identified corrected words, in accordance with an embodiment of the present invention.

DETAILED DESCRIPTION OF THE INVENTION

In the following detailed description, reference is made to the accompanying drawings which form a part hereof and, in which is shown by way of illustration, specific embodiments in which the invention may be practiced. These embodiments are described in sufficient detail to enable those of ordinary skill in the art to practice the invention, and it is to be understood that other embodiments may be utilized, and that structural, logical, and electrical changes may be made within the scope of the disclosure.

In this description, functions may be shown in block diagram form in order not to obscure the present invention in unnecessary detail. Furthermore, specific implementations shown and described are only examples and should not be construed as the only way to implement the present invention unless specified otherwise herein. Block definitions and partitioning of logic between various blocks represent a specific implementation. It will be readily apparent to one of ordinary skill in the art that the various embodiments of the present invention may be practiced by numerous other partitioning solutions. For the most part, details concerning timing considerations, and the like, have been omitted where such details are not necessary to obtain a complete understanding of the present invention in its various embodiments and are within the abilities of persons of ordinary skill in the relevant art.

Referring in general to the following description and accompanying drawings, various aspects of the present invention are illustrated to show its structure and method of operation. Common elements of the illustrated embodiments are designated with like numerals. It should be understood the figures presented are not meant to be illustrative of actual views of any particular portion of the actual structure or method, but are merely idealized representations which are employed to more clearly and fully depict the present invention.

When executed as firmware or software, the instructions for performing the methods and processes described herein may be stored on a computer readable medium. A computer readable medium includes, but is not limited to, magnetic and optical storage devices such as disk drives, magnetic tape, CDs (compact disks), DVDs (digital versatile discs or digital video discs), and semiconductor devices such as RAM, DRAM, ROM, EPROM, and Flash memory.

Figure 1:
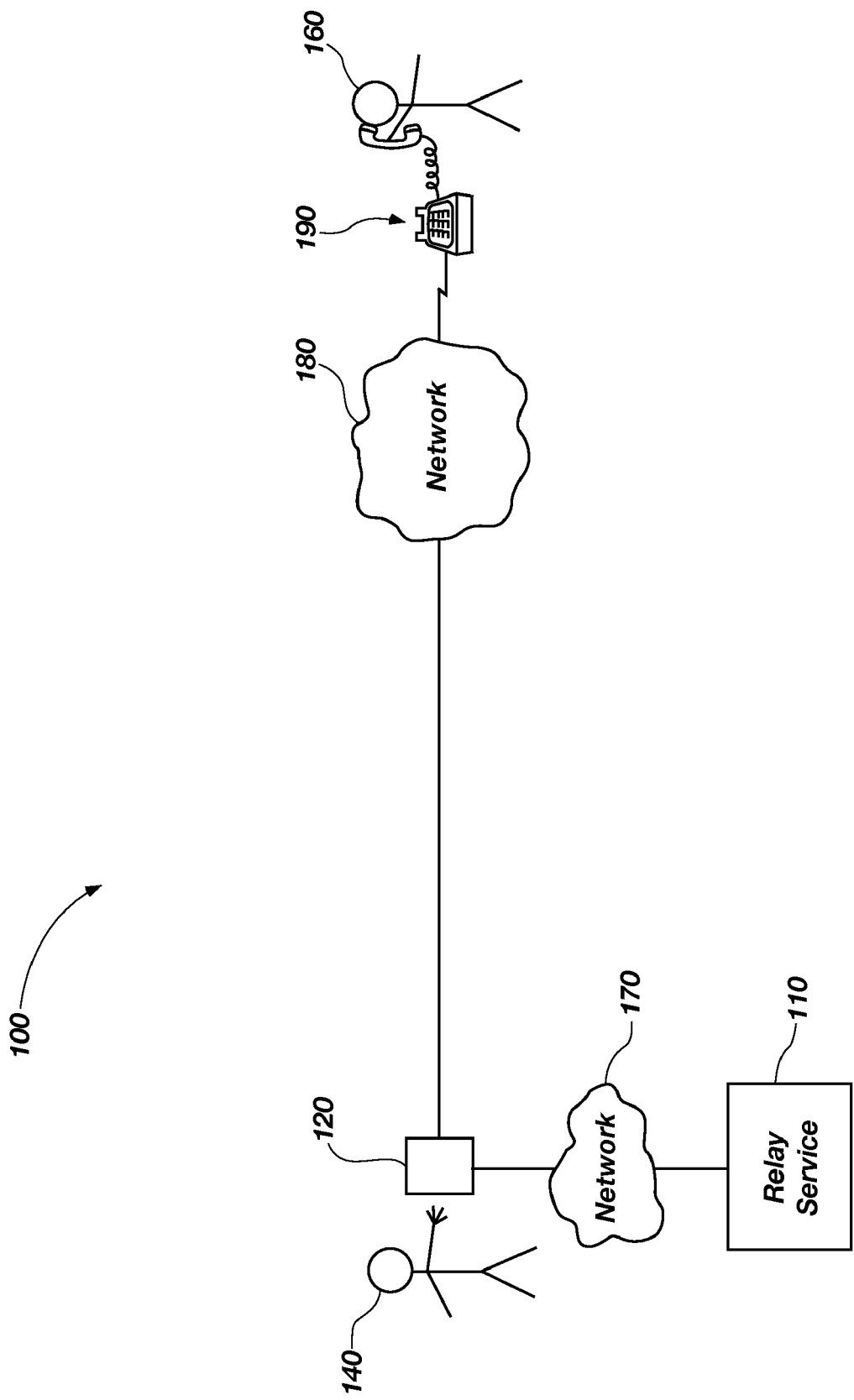
FIG. 1 illustrates a hearing-impaired communication system, in accordance with an embodiment of the present invention.

FIG. 1 illustrates a communication system 100 configured to facilitate a communication session between a hearing-impaired user and a hearing-capable user, in accordance with one or more embodiments of the present invention. Communication system 100 may include communication device 120, communication device 190, and a relay service 110. Communication device 190 may be coupled to communication device 120 via a network 180 and communication device 120 may be coupled to relay service 110 via a network 170. For example only, network 170 and network 180 may each be implemented according to the standards and bandwidth requirements of a telephone network such as the Public Switch Telephone Network (PSTN). The use of the term "telephone network" as used herein also contemplates networks that are compatible and configured to provide communications using digital standards, an example of which includes Voice Over Internet Protocol (VOIP). By way of example and not limitation, enhanced bandwidth requirements of various communication devices may be better accommodated by providing high bandwidth networks and connections thereto through various enhanced-bandwidth networking technology including DSL, Cable, Ethernet, etc.

As described more fully below, relay service 110 may be configured to provide interpretive services to hearing-impaired user 140. More specifically, a human "call assistant" within relay service 110 may be employed to facilitate a communication session between a hearing-impaired user 140 and a hearing-capable user 160. By way of example only, communication device 190 may comprise a conventional voice phone. As such, hearing-capable user 160 may interact in a conventional manner with communication device 120 through the use of a voice-based dialogue conveyed over communication device 190. The voice of hearing-capable user 160 may be conveyed over communication device 190 and may be transmitted over network 180 to communication device 120. Furthermore, the voice conveyed over communication device 190 may be transmitted through communication device 120, over network 170, and to relay service 110.

By way of example, communication device 120 may include a captioned telephone, a telephone enabled for text enhanced telephony, or any other suitable communication device configured to receive and display text. Hearing-impaired user 140 may interact in a conventional manner with communication device 190 through the use of a voice-based dialogue conveyed over communication device 120. Furthermore, as described more fully below, communication device 120 may be configured to receive and display a text transcription of a voice signal sent from relay service 110 via network 170.

In various embodiments of the present invention, instructions implementing an "application program" may be tangibly embodied in a computer-readable medium which may include one or more fixed or removable data storage devices, such as a zip drive, floppy disc drive, hard drive, CD-ROM drive, tape drive, flash memory device, etc. Further, an application program may include instructions that, when read and executed by a processor, may cause the processor to perform the steps necessary to implement and/or use embodiments of the present invention. An application program and/or operating instructions may also be tangibly embodied in a memory and/or data communications devices, thereby making a computer program product or article of manufacture according to an embodiment the present invention. As such, the term "application program" as used herein is intended to encompass a computer program accessible from any computer readable device or media. Furthermore, portions of an application program may be distributed such that some of the application program may be included on a computer readable media within a processor-based device (e.g., device 102 or device 152) and some of the application program may be included in a removable data storage device.

Figure 2:
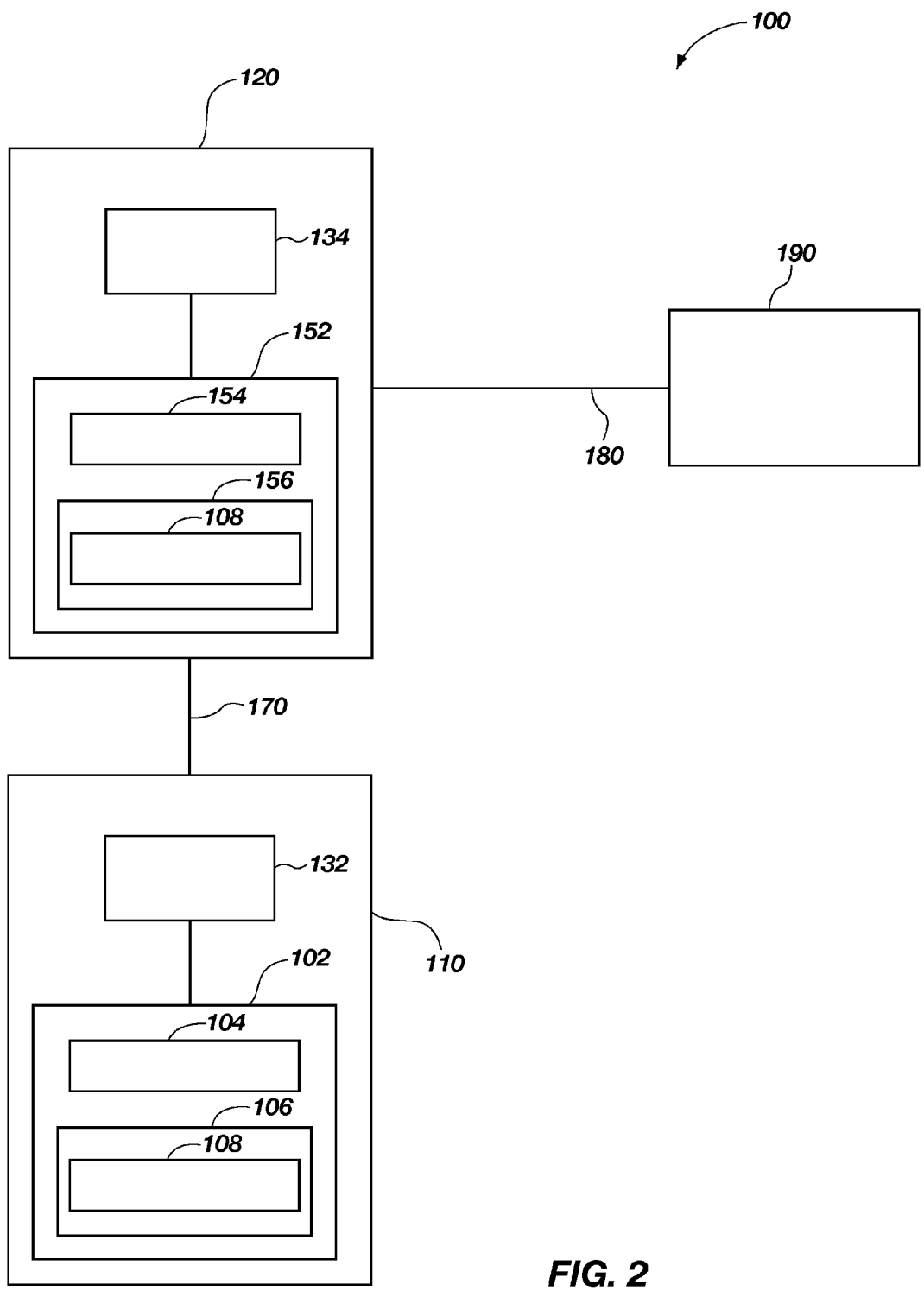
FIG. 2 is a block diagram of the communication system of FIG. 1, according to an embodiment of the present invention.

FIG. 2 illustrates a block diagram of communication system 100. As illustrated, relay service 110 may include a display device 132 coupled to a processor-based device 102 comprising a processor 104 and a memory 106, such as random access memory (RAM). Device 102 may also implement a compiler (not shown) that allows an application program 108 written in a programming language to be translated into processor 104 readable code. Application program 108 may be configured to access and manipulate data stored in memory 106 of device 102 using relationships and logic that are generated using the compiler.

Communication device 120 may include a display device 134 and a processor-based device 152 comprising a processor 154 and a memory 156, such as random access memory (RAM). Device 152 may also implement a compiler (not shown) that allows an application program 118 to be translated into processor 104 readable code. Application program 118 may be configured to access and manipulate data stored in memory 156 of device 152 using relationships and logic that are generated using the compiler.

During a contemplated operation of communication system 100, hearing-capable user 160 (see FIG. 1) may convey speech into communication device 190, which may then transmit an associated voice signal to communication device 120 over network 180. Communication device 120 may then transmit the voice signal to relay service 110. Upon receipt of a voice signal, a human call assistant (not shown) positioned within relay service 110, may listen to the voice signal transmitted from communication device 120 and "revoice" the words to a speech recognition computer program (not shown) within relay service 110. As will be understood by one having ordinary skill in the art, revoicing is an operation in which the call assistant repeats the words she or he hears upon receipt of the voice signal. The speech recognition program may then output a text transcription of the call assistant's spoken words and, thereafter, the text transcription may be transmitted to communication device 120 via network 170. Hereinafter, a text transcription output from a speed recognition program may also be commonly referred to as a "block" of text. For example, a block of text may comprise one or more words, one or more sentences, one or more lines of text, or any combination thereof.

Hearing-impaired user 140 (see FIG. 1) positioned proximate communication device 120 may receive, via network 180, the voice signal transmitted from communication device 190. Furthermore, a block of a text output from the speech recognition program and associated with the transmitted voice signal may be displayed within a text caption on display device 134 as it is sent from relay service 110 and received by communication device 120. As a result, hearing-impaired user 140 may listen to the voice signal transmitted from communication device 190 and, immediately thereafter, receive a block of text associated with the voice signal. In order to enhance the effectiveness of communication system 100, it is desirable for hearing-impaired user 140 to either receive the block of text as close to real-time as possible, or as close as possible to simultaneous receipt of the voice signal. For example only, hearing-impaired user 140 may listen to the voice signal transmitted from communication device 190 and, within three second or less, receive a block of text associated with the voice signal.

Furthermore, it should be noted that a block of text, as output from the speech recognition program and as transmitted to and displayed within a text caption on display device 134, may also be displayed within a text caption displayed on display device 132. As a result, the call assistant may view the text caption, including one or more blocks of text, as displayed on display device 134 and as viewed by hearing-impaired user 140. Therefore, any errors that may exist in the text caption displayed on display device 134 may also be visible to the communication assistant on display device 132.

In accordance with various embodiments of the present invention, application program 108 may be configured to provide in-line correction of any errors that may be detected within a text caption displayed on display device 134. Stated another way, application program 108 may be configured to replace any detected errors within a displayed text caption with corrected text. More specifically, in the event the call assistant notices one or more errors within a block of text of the text caption as displayed on each of display device 134 and display device 132, the call assistant may edit the block of text including the one or more errors through input into device 102 to correct the one or more errors. For example only, the call assistant may edit a block of text through input into a keyboard (e.g., selecting and replacing text, inserting text, and/or deleting text). As a result, a corrected block of text including one or more corrected words may be generated. Thereafter, the corrected block of text including the one or more corrected words may be sent to communication device 120. Upon receipt of the corrected block of text at communication device 120, application program 118 may be configured to replace the block of text including the one or more errors with the associated corrected block of text. Further-more, substantially simultaneously upon replacing the block of text including the one or more errors with the associated corrected block of text, application program 118 may be configured to display the corrected text caption on display device 134.

Furthermore, in order to make a correction more obvious to a hearing-impaired user reading the text caption, application program 108 may further be configured to identify each corrected word within the text caption with an identifier (e.g., a mark or a tag). By way of example and not by way of limitation, application program 108 may be configured to identify each corrected word by highlighting each corrected word displayed in a text caption on display device 134.

With reference to FIG. 3, a text caption 310 including a plurality of errors is depicted. Furthermore, as illustrated, text caption 310 includes blocks of text 312, 314, and 316. For example, each block of text 312, 314, and 316 may be generated by a speech recognition program and subsequently transmitted from relay service 110 and received by and displayed within text caption 310 displayed on display device 134 (see FIG. 2). Furthermore, text caption 310 may be displayed on display device 132 within relay service 110 (see FIG. 2) visible to a call assistant. In the event the call assistant notices one or more errors within text caption 310, the call assistant may edit the text displayed on display device 132 through input into device 102 to correct the one or more errors and, as a result, may generate a corrected block of text including one or more corrected words. For example, with reference to FIGS. 3 and 4, a call assistant may recognize one or more errors within block 314 and, thereafter, generate a corrected block of text 414 including one or more corrected words 414 and 416. Thereafter, corrected block of text 414 may be transmitted from relay service 110 and received by communication device 120. Block of text 314 may then be replaced by corrected block of text 414, as illustrated in text caption 510 (see FIG. 5). Further, as illustrated in FIG. 5, application program 118 (see FIG. 2) may be configured to display corrected words (i.e., words 414 and 416) within text caption 510 with a marking (i.e., a tag), such as a highlight 520.

It should be noted that a block of text including one or more corrected words may be sent at any suitable time after the call assistant has identified one or more errors and made associated corrections. For example, the call assistant may notice one or more errors in the most recently sent block of text, correct the one or more errors, and transmit a corrected block of text including one or more corrected words prior to sending another block of text. On the other hand, the call assistant may not notice one or more errors in a block of text until after one or more blocks have subsequently been sent. In any event, any block of text displayed on a display device 134 (see FIG. 2) may be replaced with a corrected block of text including one or more corrected words.

Figure 6:
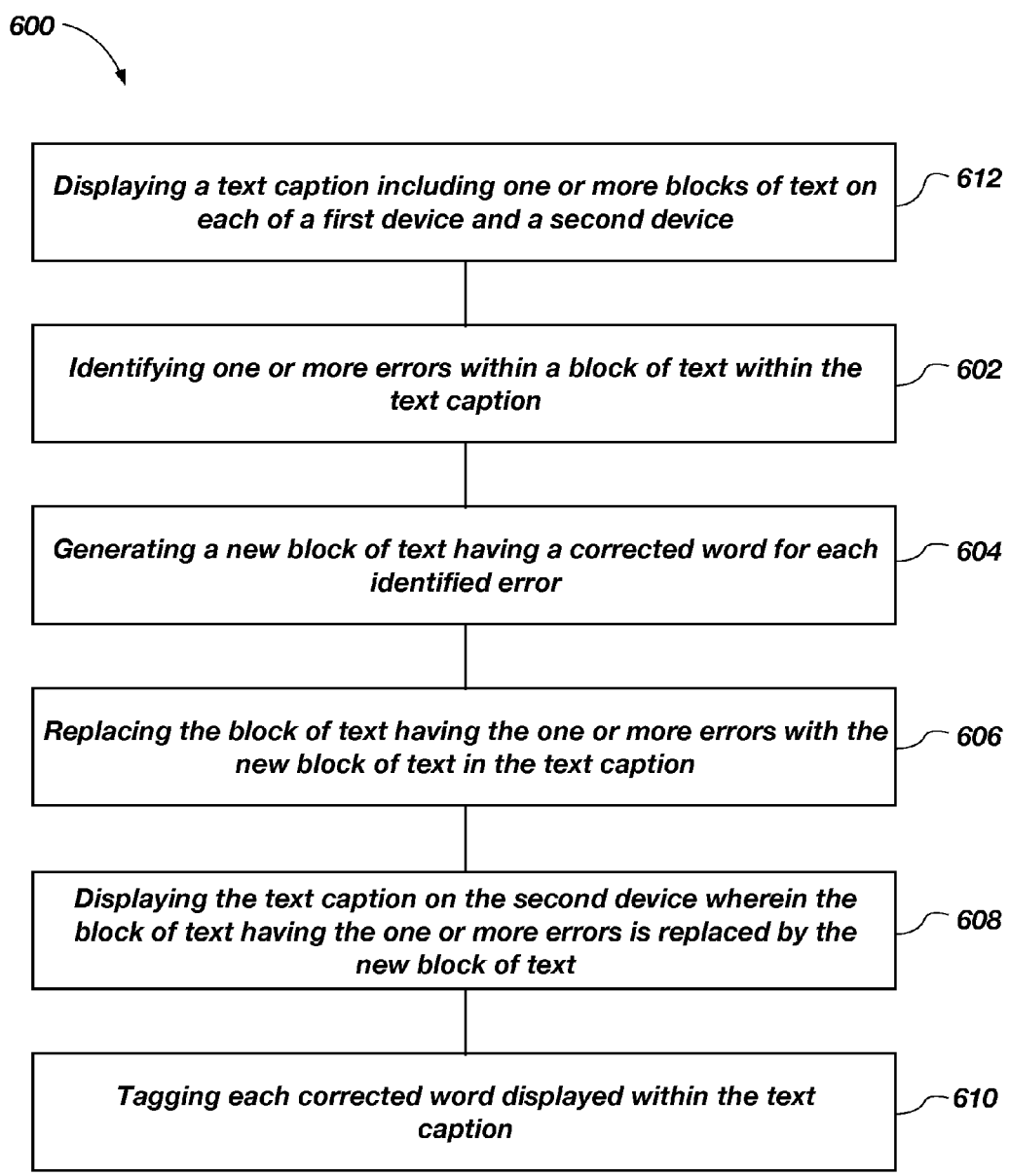
FIG. 6 is a flow chart illustrating a method of providing error correction within a text caption, according to an embodiment of the present invention.

FIG. 6 is a flow chart illustrating a method 600 of correcting one or more textual errors within a text caption, in accordance with one or more embodiments of the present invention. Method 600 may include displaying a text caption including one or more blocks of text on each of a first device and a second device 612. Moreover, method 600 may include identifying one or more errors within a block of text within text caption 602 and generating a new block of text having corrected word for each identified error 604. Method 600 may further include replacing the block of text having the one or more errors with the new block of text in the text caption 606. In addition, method 600 may include displaying the text caption on the second device wherein the block of text having the one or more errors is replaced by the new block of text 608. In addition, method 600 may include tagging each corrected word displayed within the text caption 610.

As described above in various embodiments of the present invention, an error detected in a text caption may be replaced with corrected text (i.e., "in-line" correction) and, therefore, in comparison to conventional text caption correction methods, a user viewing the text caption may be provided with a context of the error correction. Stated another way, upon completion of an error correction within a text caption, a reader may understand how the correction relates to the text caption as a whole and will not be required to guess as to where the correction belongs within the text caption or how the correction applies to the text caption. Furthermore, in comparison to conventional text caption correction methods, in-line correction of a text caption may reduce distractions to a hearing-impaired user and, therefore, interruptions in the flow of conversation between a hearing-capable user and a hearing-impaired user may be reduced.

While the present invention has been described herein with respect to certain preferred embodiments, those of ordinary skill in the art will recognize and appreciate that it is not so limited. Rather, many additions, deletions, and modifications to the preferred embodiments may be made without departing from the scope of the invention as hereinafter claimed. In addition, features from one embodiment may be combined with features of another embodiment while still being encompassed within the scope of the invention as contemplated by the inventors.

What is claimed is:

1. A method of providing error correction in a text caption, the method comprising:
   displaying a text caption on at least one electronic device, the text caption including one or more blocks of text representing a text transcription of a voice signal;
   replacing a first block of text of the text caption with another block of text during a real-time conversation from which the voice signal is generated; and
   displaying another block of text within the text caption on the at least one electronic device at a location of the first block of text within the text caption.

2. The method of claim 1, further comprising identifying one or more errors within the first block of text of the text caption with respect to what was said in the voice signal prior to generating the another block of text.

3. The method of claim 1, further comprising generating the another block of text with a first device and transmitting the another block of text to the at least one electronic device.

4. The method of claim 3, wherein generating another block of text comprises:
   identifying one or more errors within the first block of text of the text caption; and
   generating the another block of text including the first block of text of the text caption having each of the one or more errors replaced with corrected text within the text caption.

5. The method of claim 4, wherein displaying the another block of text further comprises tagging the corrected text within the text caption.

6. The method of claim 5, wherein tagging the corrected text comprises highlighting the corrected text within the text caption.

7. The method of claim 1, wherein the first block of text of the text caption includes one or more errors, and wherein the another block of text includes corrected words.

8. The method of claim 1, further comprising generating the text caption on a first device and transmitting the text caption to the at least one electronic device.

9. A communication system, comprising:
   a communication device including a processor;
   a computer-readable medium coupled to the processor;
   a display coupled to the processor; and
   at least one application program stored in the computer-readable medium, wherein the at least one application program, when executed by the processor, is configured to:
      display a text caption including one or more blocks of text on the display, the text caption indicating a text transcription of a voice signal received by the communication device; and
      display another block of text within the text caption on the display at a location that corresponds to an actual location as produced by the voice signal.

10. The communication system of claim 9, wherein the at least one application program is further configured to tag at least one word of the another block of text within the text caption as a corrected word.

11. The communication system of claim 9, wherein the at least one application program is further configured to display at least one word within the text caption having the one or more blocks of text of the text caption replaced by the another block of text as highlighted.

12. The communication system of claim 9, wherein a highlighted word is indicative of a corrected word.

13. The communication system of claim 9, wherein the at least one application program is further configured to replace at least one block of text of the text caption with the another block of text and display the text caption on the display of the communication device substantially simultaneously.

14. A computer-readable media storage medium storing instructions that when executed by a processor cause the processor to perform a method for providing error correction in a text caption, the method comprising:
   displaying a text caption representing a text transcription of a voice signal transmitted between a first device and a second device, the text caption including at least one block of text; and
   displaying another block of text within the text caption on at least one of the first device and the second device by replacing the at least one block of text by the another block of text at a location of the at least one block of text within the text caption.

15. The computer-readable media storage medium of claim 14, wherein displaying the another block of text within the text caption includes identifying at least one word within the another block of text with a tag.

16. The computer-readable media storage medium of claim 15, wherein identifying at least one word within the another block of text with a tag comprises highlighting the at least one word.

17. A method, comprising:
   generating a text caption as a text transcription of a voice signal;
   transmitting the text caption to a communication device;
   identifying an error in a block of text within the text caption; and
   transmitting a corrected block of text to the communication device as an inline correction for the text caption to replace the block of text within the text caption with the corrected block of text at a proper location as produced in the voice signal during communication between at least two parties.

18. The method of claim 17, wherein the error is a disagreement between the text caption and what was stated in the voice signal.

19. The method of claim 17, wherein transmitting the text caption and the corrected block of text includes transmitting data from a relay service including a call assistant to facilitate communication between a hearing-impaired user and a hearing-capable user.

20. The method of claim 19, further comprising receiving the voice signal at the relay service for generating the text transcription of the voice signal.

21. The method of claim 20, further comprising generating the text transcription of the voice signal by employing a voice recognition program.

22. The method of claim 21, wherein generating the text caption includes the call assistant revoicing words heard from the voice signal for the voice recognition program to generate the text caption.

23. The method of claim 19, further comprising displaying the text caption on a communication device associated with the call assistant.

24. The method of claim 17, further comprising a call assistant generating the corrected block of text by inputting edits into the block of text prior to the corrected block of text being transmitted to the communication device.

25. A method, comprising:
displaying a text caption on a communication device, the text caption corresponding to a text transcription of at least a portion of a voice signal of a conversation between at least two parties;
receiving a corrected block of text for at least one block of text within the text caption;
displaying the corrected block of text within the text caption as an inline correction during the conversation, such that the corrected block of text appears within the text caption in place of the at least one block of text; and
indicating that the corrected block of text replaced the at least one block of text.

26. The method of claim 25, wherein indicating that the corrected block of text replaced the at least one block of text includes highlighting the corrected block of text within the text caption.

27. The method of claim 25, further comprising:
receiving the voice signal first by the communication device;
transmitting the voice signal to a relay service for generating the text transcription of the voice signal;
receiving the text transcription from the relay service and displaying the text caption in response thereto; and
receiving the corrected block of text from the relay service and displaying the corrected block of text within the text caption in response thereto.

28. The method of claim 25, wherein the corrected block of text is selected from the group consisting of at least one word, at least one sentence, and at least one line of text.

29. A method, comprising:
displaying a text caption on a communication device, the text caption corresponding to a text transcription of at least a portion of a voice signal of a conversation between at least two parties;
replacing at least one block of text of the text caption with a corrected block of text;
displaying the corrected block of text within the text caption as an inline correction during the conversation, such that the corrected block of text appears within the text caption in a proper location as produced in the voice signal, wherein replacing at least one block of text with a corrected block of text and displaying the corrected block of text within the text caption occur at least substantially simultaneously; and
indicating that the corrected block of text replaced the block of text.

* * * * *

(12) INTER PARTES REVIEW CERTIFICATE (75th)
United States Patent
Romriell et al.

(10) Number: US 8,379,801 K1
(45) Certificate Issued: Mar. 30, 2015

(54) METHODS AND SYSTEMS RELATED TO TEXT CAPTION ERROR CORRECTION

(75) Inventors: Joseph N. Romriell; Scot Lorin Brooksby; Shane Arthur Roylance; Brian Chevrier; Robert Cochran Puzey

(73) Assignee: Sorenson Communications, Inc.

Trial Number:

IPR2013-00288 filed May 17, 2013

Petitioner: Ultratec, Inc.

Patent Owner: Captioncall, L.L.C.

Inter Partes Review Certificate for:

Patent No.: 8,379,801
Issued: Feb. 19, 2013
Appl. No.: 12/624,973
PCT Filed: Nov. 24, 2009

The results of IPR2013-00288 are reflected in this inter partes review certificate under 35 U.S.C. 318(b).

INTER PARTES REVIEW CERTIFICATE
U.S. Patent 8,379,801 K1
Trial No. IPR2013-00288
Certificate Issued Mar. 30, 2015

AS A RESULT OF THE INTER PARTES REVIEW PROCEEDING, IT HAS BEEN DETERMINED THAT:

Claims 3-6, 8 and 10-29 are cancelled.

Claims 1, 2, 7 and 9 are disclaimed.

\* \* \* \* \*